S. OLSZEWSKI.
TRAFFIC SIGNAL FOR AUTOMOBILES.
APPLICATION FILED MAY 18, 1917.
1,349,689.
Patented Aug. 17, 1920.
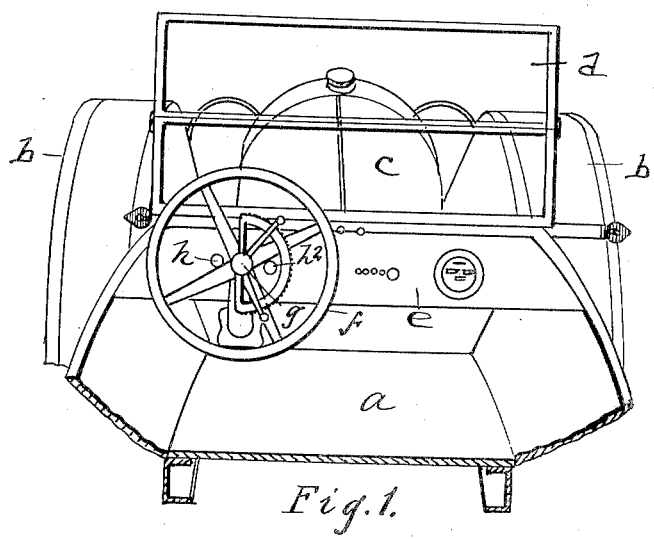
Fig. 1.
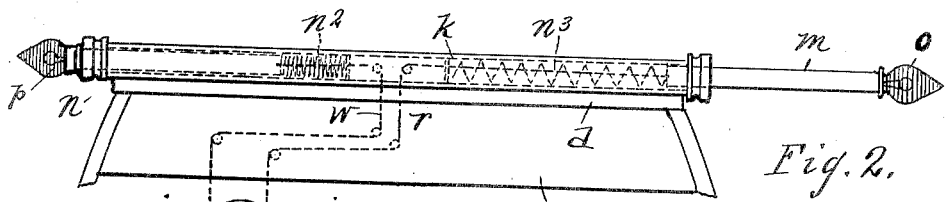
Fig. 2.
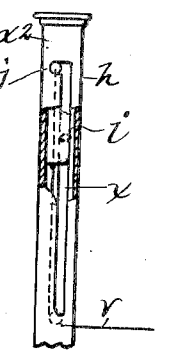
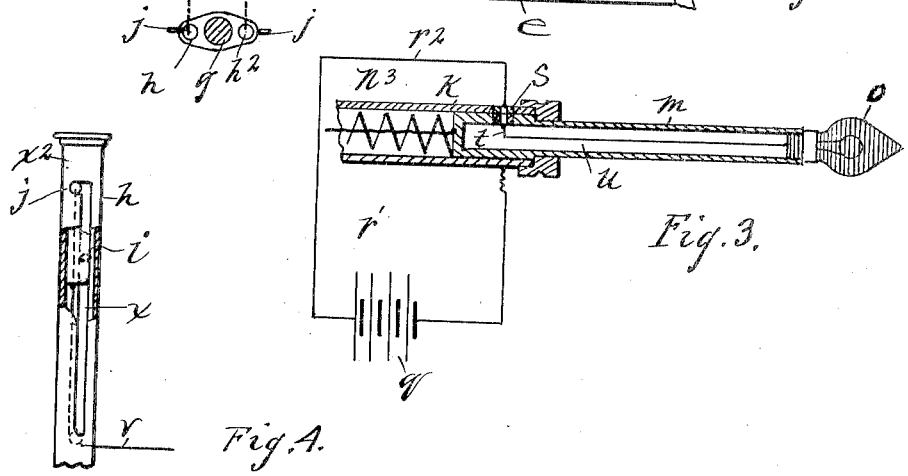
Fig. 3.
Fig. 4.
Inventor
SYLVESTER OLSZEWSKI.
By Ralzemond A. Parker
Attorney

UNITED STATES PATENT OFFICE.

SYLVESTER OLSZEWSKI, OF DETROIT, MICHIGAN.

TRAFFIC-SIGNAL FOR AUTOMOBILES.

1,349,689. Specification of Letters Patent. Patented Aug. 17, 1920.

Application filed May 18, 1917. Serial No. 169,398.

*To all whom it may concern:*

Be it known that I, SYLVESTER OLSZEWSKI, a citizen of the United States, residing at Detroit, county of Wayne, State of Michigan, have invented a certain new and useful Improvement in Traffic-Signals for Automobiles, and declare the following to be a full, clear, and exact description of the same, such as will enable others skilled in the art to which it pertains to make and use the same, reference being had to the accompanying drawings, which form a part of this specification.

My invention relates to traffic signals for automobiles and an object of my improvements is to provide an improved construction by which the driver of an automobile may signal to a following vehicle, which shall be cheap and simple to construct and convenient to assemble.

I secure this object in the device illustrated in the accompanying drawing in which:

Figure 1 is a perspective view of the forward part of an automobile looking from the rear.

Fig. 2 is a detail plan view of a part of the same.

Fig. 3 is a detail sectional view, and

Fig. 4 is a detail elevation of a part of the signaling apparatus.

$a$ indicates the body of the automobile, $b$ $b$ the front wheel fenders, $c$ the hood, $d$ the wind shield and $e$ the dash or instrument board. $f$ is the steering wheel and $g$ the steering post. Transversely of the body in front of the wind shield and near the lower edge thereof I secure a tube $k$. In each end of this tube reciprocates a second tube $m$ or $n$ having its inner end closed and provided at its outer end with a signal light $o$ or $p$. The tubes $m$ and $n$ fit and reciprocate as pistons in the tube $k$ and there is provided a spring $n^2$ or $n^3$ located within the tube $k$ which acts to force the tubes $n$ or $m$ outward.

$h$ and $h^2$ are tubes located upon opposite sides of the steering post $g$ parallel and secured to said post. Each of the tubes $h$ or $h^2$ has a longitudinal slot through its wall and from each of the pistons $i$ there projects laterally a pin $j$ which extends through the slot $x$. Said slot turns sidewise as shown at $x^2$ at its upper end.

There is a wire $v$ or other suitable flexible connecting means joining the inner end of the tube $m$ to the lower end of one of the pistons $i$, said wire passing around suitable directing and friction reducing guides. There is a similar wire $w$ connecting the other piston $i$ with the inner end of the tube $n$. The wires $v$ and $w$ are so located that when a piston $i$ is drawn upward the tube $m$ or $n$ connected thereto by said wire is drawn to its inner position against the action of its spring, as shown at the left of Fig. 2. The piston $i$ is drawn upward to retract the tube $m$ or $n$ by means of the pin $j$ and then is turned about its axis to pass into the horizontal extension $x^2$ of the slot $x$ so as to hold the piston at its elevated position and the connected tube in its inner position, against the resistance of its spring. Normally both the tubes $m$ and $n$ are drawn inward and held in their retracted position.

If it is desired to signal that the driver is going to turn to the right the piston $i$ in the tube $h^2$ is turned to remove the pin $j$ from the part $x^2$ of the slot, then the piston $i$ is free to descend and the tube $m$ is thrust outward by its spring $n^3$ as shown at the right of Fig. 2.

If it is desired to turn to the left, the other piston $i$ in the tube $h$ is similarly released so that the spring $n^2$ throws the tube $n$ to its outer position.

When the tube $m$ or $n$ is thrown to its outer position the lamp $o$ or $p$ at its outer end is lighted. This is accomplished by the apparatus shown in diagram in Fig. 3 in which $q$ indicates a battery, $r'$ and $r^2$ wires or conductors, one of which is conducted to an insulated plug $s$ passing through the wall of the tube $k$. $t$ is a plug passing through the wall of the tube $m$ and to one strand of the filament of the lamp $o$, the other filament is connected in the usual way to the ground through the tubes $m$ and $k$. The plugs $s$ and $t$ are so located that when the tube $m$ is thrown to its outer position the circuit is completed through the battery $q$ and the light $o$ lighted. The construction is the same upon the other side of the vehicle.

What I claim is:

1. In an apparatus of the kind described, a reciprocating signal part, a spring acting to force said signal part to its effective position, a tube secured adjacent to the steering post and approximately parallel ar having a longitudinal slot through its wall, said slot turning at right angles at one end, a piston adapted to reciprocate in said tube and having a laterally extending pin extending through said slot, said piston being connected to said signal part so that when it is moved toward the end of said tube at which is the lateral extension of said slot, it shall retract said signal part against the action of its spring, said piston being adapted to turn to permit said pin to extend in the laterally extending part of said slot and secure the parts in the retracted position of said signal part, substantially as and for the purpose described.

2. In an apparatus of the kind described, a signal part adapted to reciprocate, a spring acting to thrust said signaling part to its effective position, a tube secured adjacent to the steering post and approximately parallel thereto, a flexible connection extending through the wall of the first named tube and connected with said signal part, said connection extending into said tube on the steering post, a slot in the wall of the last named tube, and means extending through said slot and connected to said flexible connection for drawing upon said flexible connection to bring said signal part to its inner position against the action of the spring, the means connected to said flexible connection extending through said slot being adapted to be locked to hold the signal part in its retracted position and to be unlocked, substantially as and for the purpose described.

In testimony whereof, I sign this specification.

SYLVESTER OLSZEWSKI.